United States Patent [19]

Heiser, Jr.

[11] Patent Number: 4,770,859
[45] Date of Patent: Sep. 13, 1988

[54] DISPENSER FOR CHEMICALS

[75] Inventor: Arthur J. Heiser, Jr., Costa Mesa, Calif.

[73] Assignee: Onshore Technology, Inc., Costa Mesa, Calif.

[21] Appl. No.: 921,527

[22] Filed: Oct. 21, 1986

[51] Int. Cl.$^4$ .................. B01D 12/00; B01F 1/00; B01F 17/00

[52] U.S. Cl. .................. 422/264; 422/266; 134/93; 222/325

[58] Field of Search .......... 422/264, 266, 261, 264 B; 222/185, 325; 137/268; 4/57 D, 58 D; 134/93

[56] References Cited

U.S. PATENT DOCUMENTS

| | | | |
|---|---|---|---|
| 2,538,720 | 1/1951 | Wood | 422/264 |
| 3,125,105 | 3/1964 | Geiger | 134/93 |
| 3,578,776 | 5/1971 | Schneider, Jr. et al. | 422/264 |
| 4,250,911 | 2/1981 | Kratz | 422/264 |

Primary Examiner—Barry S. Richman
Assistant Examiner—Timothy M. McMahon
Attorney, Agent, or Firm—Weissenberger & Peterson

[57] ABSTRACT

A device for dispensing a caked composition into a liquid employs a container filled to a desired level with a cake of the composition to be dispensed, and an upwardly opening vessel over which to place the container telescopically so that the cake surface is disposed over the vessel mouth. A support structure is included upon which the vessel is mounted in a position enabling placement of the container over the vessel, the support structure serving to support the vessel so that the vessel mouth is facing upwardly and the rim portion is disposed horizontally. Liquid coupling components couple a flow of liquid from a separate source through an inlet opening in the vessel, so that with the cake surface disposed over the vessel mouth, the liquid fills the vessel, washes across the cake surface to dispense the composition from the cake, and then discharges over the rim portion.

19 Claims, 3 Drawing Sheets

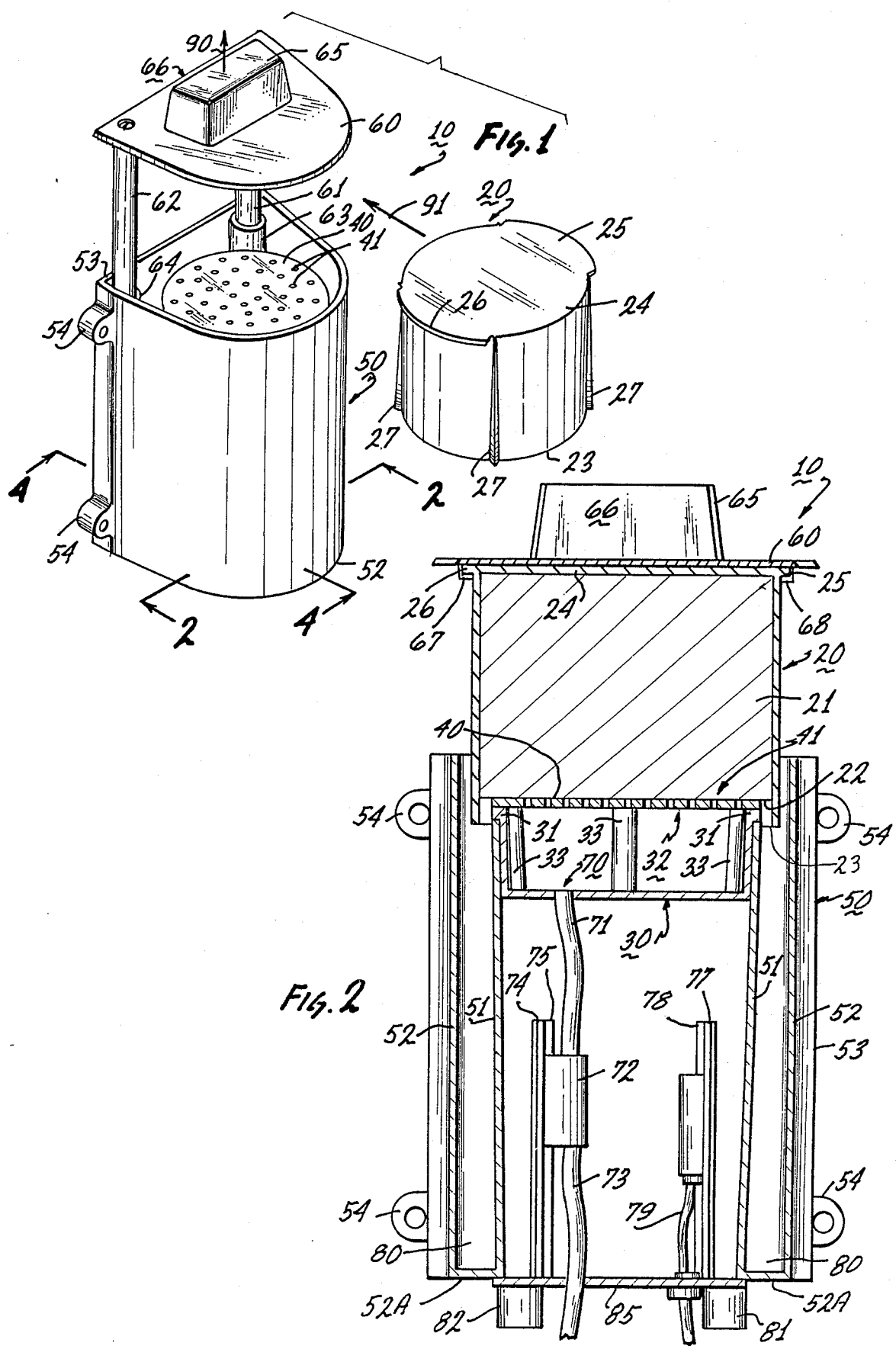

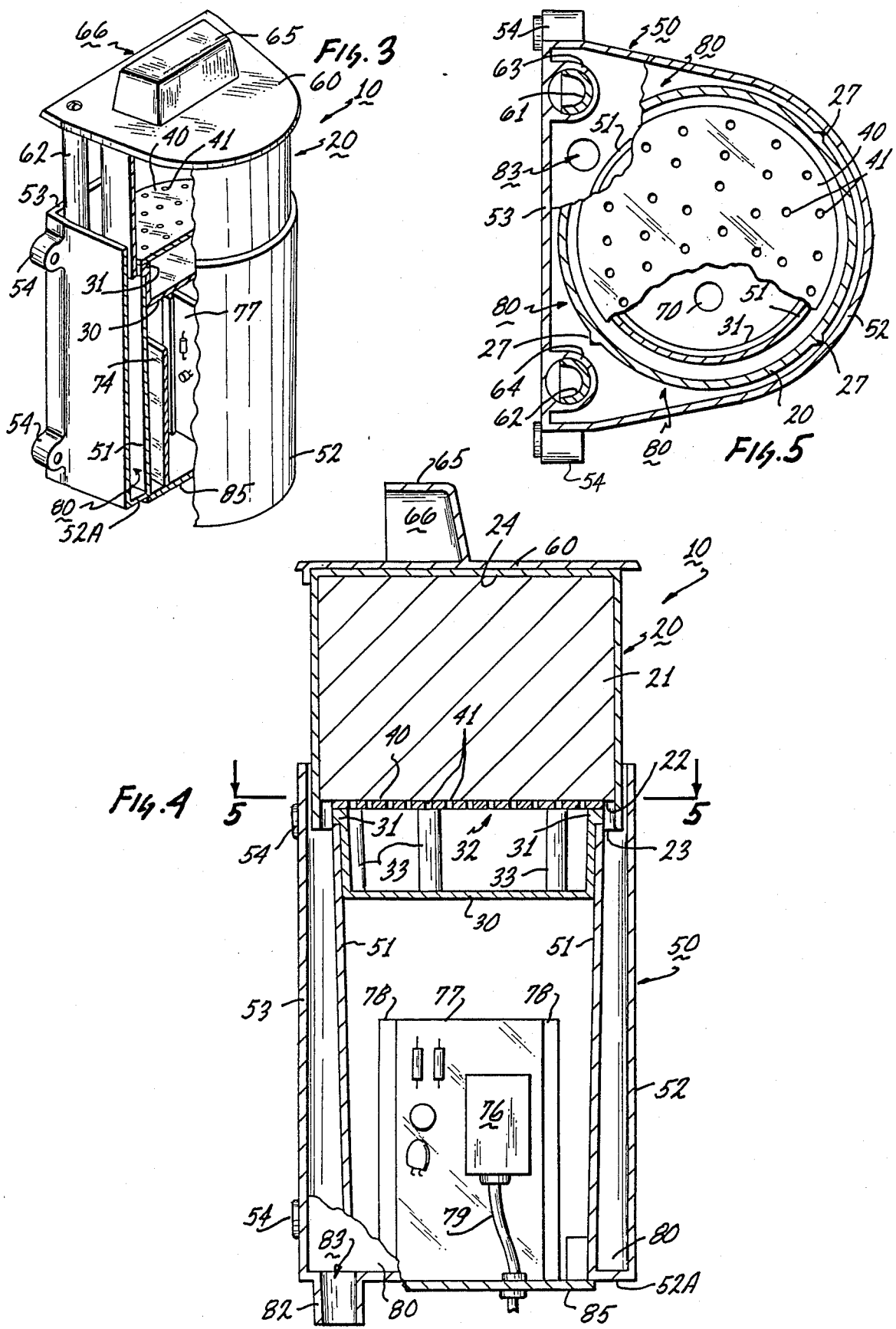

DISPENSER FOR CHEMICALS

BACKGROUND OF THE INVENTION

1. Technical Field

This invention relates generally to devices for dispensing chemicals, and more particularly to a new and improved device for dispensing a caked composition into a liquid.

2. Background Information

Many advantages accompany point-of-use preparation of solutions from a concentrated supply. Instead of shipping containers of prepared solution, the supplier ships a solid composition and the user prepares the solution as needed. Shipping bulk and expense decrease while handling convenience and safety increase, and appropriate dispensing equipment simplifies solution preparation to insure an ample supply when needed with little user effort.

Commercial dishwashing applications provide a typical example. They employ a concentrated soap cake at the point of use which is dispensed into water by water jets spraying against and eroding the cake. In this manner, a desired quantity of soap solution is produced when needed with all the advantages of point-of-use preparation. However, the equipment used for dispensing the soap cake, or other caked compositions, often suffers from certain drawbacks that need improvement.

Soap cake, for example, is typically mounted in an enclosure, sprayed with hot water, and then replenished periodically. This often involves significant time and inconvenience in handling and mounting the cake, and thus it is desirable to have a new and improved device that alleviates this concern—one that facilitates handling and mounting of a caked composition to be dispensed.

Once mounted within the enclosure, jets of water spray against the cake to erode the composition, and this requires adequate pressure regulation to control the rate of cake erosion. Furthermore, the spray is not uniform and it strikes the cake at various angles, both of these factors resulting in varying erosion rates along the cake surface. Thus, the spray both dispenses the composition in varying concentrations and eventually causes the cake to crumble as some areas erode more quickly. Therefore, it is desirable to have an improved device that foregoes the need for pressure regulation while dispensing the composition more evenly from the cake, to provide a more uniform concentration and alleviate crumbling.

In addition, placement of the cake in an enclosure for spraying often hides it from view. Thus, in order to determine when to replenish the cake, a user must either time the period over which the cake has been sprayed or stop the jets periodically and open the enclosure to view the cake. Doing so involves more time and inconvenience, and, consequently, it is desirable to have a device that facilitates this determination.

SUMMARY OF THE INVENTION

Therefore, the principal object of the present invention is to provide a new and improved device for dispensing a caked composition into a liquid.

It is an object to provide such a new and improved device that facilitates handling and mounting of a caked composition to be dispensed.

It is a further object to provide such a device that foregoes the need for pressure regulation, and one that dispenses the composition more uniformly from the cake to provide a more uniform concentration and alleviate crumbling.

And it is yet another object to provide a convenient indicator of the amount of cake dispensed.

Briefly, the above and further objects of the present invention are realized by providing a device for dispensing a caked composition into a liquid, that employs a container filled to a desired level with a cake of the composition to be dispensed, to provide a cake surface accessible through an end of the container. In one form of the invention, this may be an open end, thirteen-centimeter diameter drum filled with soap cake.

An upwardly opening vessel upon which to place the cake is included. The vessel has a rim portion defining a vessel mouth, and a size and shape enabling the end of the container to be placed telescopically over the rim portion to a position in which the cake surface is disposed over the vessel mouth. In one form of the invention, the vessel may be a two to five-centimeter deep cylindrical tray over which the open end of the container fits.

A support structure is provided upon which the vessel is mounted. The support structure supports the vessel so that the vessel mouth is facing upwardly and the rim portion is disposed horizontally, in a position enabling placement of the container over the vessel. This may take the form of a framework adapted to be screwed to the wall adjacent a commercial dishwashing machine.

Liquid coupling components couple a flow of a liquid from a separate source through an inlet opening in the vessel. With the cake surface disposed over the vessel mouth, the liquid fills the vessel, washes across the cake surface to dispense the composition from the cake, and then discharges over the rim portion. As the composition is thus dispensed, the container descends over the vessel so that the cake surface remains closely adjacent the vessel mouth until fully dispensed.

One form of the invention includes an apertured member disposed across the vessel mouth that defines an array of openings through which the liquid must flow. This equalizes the flow of liquid across the cake surface.

A timer and solenoid valve arrangement may also be included for controlling the supply of liquid to the vessel, along with suitable structure for collecting and outletting the liquid once it has discharged over the rim. In addition, a spring biased guide mechanism may be provided to retain the container in desired alignment, while exerting downward force to keep the cake surface closely adjacent the vessel mouth.

Thus, the device of this invention overcomes many drawbacks of existing dispensing equipment. The container filled with a caked composition both facilitates handling and enables convenient placement over the vessel. In addition, the action of the liquid washing across the cake surface foregoes the need for pressure regulation, and it dispenses the composition more uniformly from the cake to provide a more uniform concentration and alleviate crumbling.

Moreover, the relative position of the container atop the vessel provides a convenient indicator of the amount of cake dispensed. And a stop cake dispenser according to the invention functions with both hot and cold water, and with little water pressure.

BRIEF DESCRIPTION OF THE DRAWINGS

FIG. 1 of the drawings is a perspective view of the device of this invention illustrating the placement of the cake-filled container between the guide member and the vessel;

FIG. 2 is a cross sectional elevation view with the container in place, taken on line 2—2 of FIG. 1;

FIG. 3 is perspective view similar to FIG. 1 with portions broken away to illustrate the internal components;

FIG. 4 is a side cross sectional view taken on line 4—4 of FIG. 1;

FIG. 5 is a cross sectional view taken on line 5—5 of FIG. 4, with portions broken away to show the inlet and outlet openings;

DESCRIPTION OF THE PREFERRED EMBODIMENTS

Figure 6:
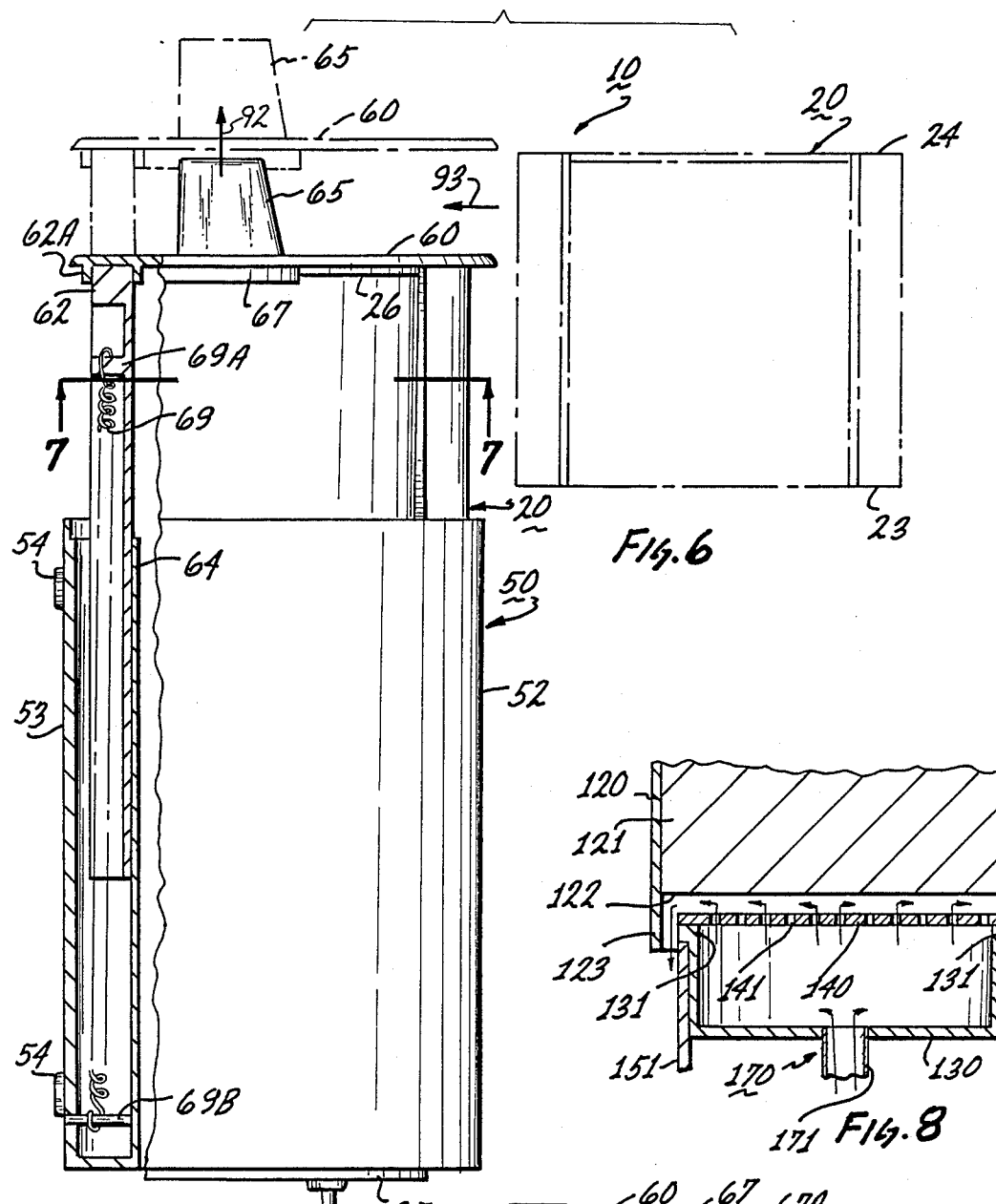
FIG. 6 is a side elevation view of the device with portions broken away to illustrate details of the guide mechanism.

Referring now to the drawings, there is shown a device 10 constructed according to the invention. It is designed for mounting on a wall for use in dispensing cake soap into water solution, but the inventive concepts are equally applicable to different structures for dispensing a cake composition into a liquid.

Generally, the device 10 employs an open end container 20 filled with a cake of the composition to be dispensed, an upwardly opening vessel 30 over which to place the open end of the container, and an apertured member 40 disposed between the vessel mouth and the cake for equalizing water flow from the vessel to the surface of the cake. It also includes a support structure 50, a guide member 60, and the inlet opening 70 together with associated liquid coupling components. In addition, a liquid collection well 80 and outlet components are provided.

Considering first the container 20 (FIG. 1), it is a cylindrical container, such as a thirteen-centimeter diameter drum, fabricated from a suitable material, such as a thermoplastic material, by known techniques, such as molding. It is filled to a desired level with a cake 21 of the composition to be dispensed to provide a cake surface 22 facing open end 23. This provides a cake surface that is accessible through the open end 23, and it is this cake surface 22 from which the composition is dispensed.

The container 20 includes a closed end 24 opposite the open end 23. At the closed end 24, a pair of radially outwardly extending, integrally-formed flanges 25 and 26 provide means for engaging the container 20 with the container-engaging, or guide member 60, as will be subsequently discussed.

The container 20 includes a plurality of integrally-formed ribs 27 disposed on the exterior of the container 20 to enhance gripping engagement of the container with the hands of a user. This is especially useful when the container on the hands of the user become wet during use of the device 10.

Known techniques of filling the container with the caked composition are employed, such as filling with a liquid composition which is allowed to solidify to form the cake. A plastic sheet may be used to cover the open end for shipment. This may often be done by a supplier, with the container being eventually shipped to a user for point-of-use preparation of a liquid solution from the caked composition. And once the cake composition has been used, the container can be refilled, discarded, or put to another use, as desired. Thus, a convenient to handle and easy to use container is provided.

Considering next the vessel 30 (FIGS. 2, 3, and 4), it is also molded from a thermoplastic material according to known techniques. It has a rim portion 31 defining a vessel mouth 32, and a size and shape enabling the open end 23 of container 20 to be placed over the rim portion to a position in which the cake surface 22 is disposed over the vessel mouth in the manner illustrated.

Thus, like container 20, vessel 30 employs a generally cylindrical shape over which the container 20 can descend telescopically as the composition is dispensed from the cake. In addition, the rim portion 31 extends radially outward to provide a means of supporting the vessel with the support structure 50, while the ribs 33 on the interior of the vessel 20 help support the apertured member 40 in a position disposed across the vessel mouth.

In one form of the invention, the vessel 20 is a five-centimeter deep cylindrical tray, but various other structures may be employed to define an upwardly opening mouth over which the container can be placed telescopically with the cake surface disposed over the vessel mouth. Thus, as used herein the word "vessel" is intended to refer to any other such structure.

The apertured member 40 FIGS. (1-5) is a circular plate molded of thermoplastic material to have a size and shape enabling placement atop the rim portion 31 as illustrated. It may be attached removably to the vessel 31 in this position by suitable means, such as integrally formed pegs extending downwardly from the apertured member into mating holes in the ribs 33.

The apertured member 40 defines an array of through holes, or openings 41, through which liquid must pass in flowing out of the vessel mouth 31 to the cake surface 22. This equalizes the flow of liquid across the cake surface to achieve more uniform composition dispensing, pressures within a range of twenty to sixty pounds-per-square-inch working satisfactorily.

Support structure 50 supports the vessel 31 in a position enabling placement of the container 20 over the vessel, and so that the vessel mouth 32 faces upwardly and the rim portion 31 is disposed horizontally. This is achieved in the illustrated embodiment of the invention by a molded thermoplastic support structure that includes an upright cylindrical sleeve portion, sleeve 51, that is in turn supported by an enclosure comprising the forward enclosure portion 52 of the support structure 50 and the rearward portion, backplate 53. The vessel 30 sits telescopically within an upper end portion of the sleeve 51; with the rim portion 31 abutting the end portion. Thus, the container 20 can descend telescopically over both the vessel 30 and the sleeve 51 supporting the vessel, and the vessel 30 can be removed from the sleeve for cleaning purposes and to gain access to the interior of the sleeve.

The support structure 50 includes four mounting ears 54 attached to the backplate 53 for use in mounting the support structure to a generally vertical surface, such as a wall. Thus, it provides a light weight, inexpensive support, and one that can be readily installed at a convenient height adjacent other equipment with which it is used.

With the support structure 50 mounted in this manner, the container 20 is placed over the vessel 30 to dispense the caked composition. Molded thermoplastic guide member 60 assists by retaining the container in alignment with vessel 30 and by exerting a downward force on the container to keep the cake surface closely adjacent the vessel mouth. The guide member is lifted up in the direction of arrow 90 in FIG. 1, and then the container 20 is inserted in the direction of arrow 91.

Suitable mounting components are included to enable this. The guide member 60 is mounted on hollow posts 61 and 62 (FIGS. 1, 3, and 6), and the posts are mounted movably to support structure 50 within sleeves 63 and 64. The guide member includes posts mountings 61A and 62A on the underside (FIG. 7), and these define recesses 61B and 62B. The upper ends of the posts are attached to the guide member within the recesses by suitable means such as screws extending through the guide member into the post ends (not shown). Attachment of post 62 in this manner is visible in FIG. 6.

A spring member 69 (FIG. 6) is mounted within each one of the posts to spring bias the guide member toward the lower, retracted position. Each one of the springs is secured by suitable means to an upper portion 69A of a corresponding one of the posts, and a lower portion 69B of the corresponding one of the sleeves 63 and 64.

Mounted in this manner, the guide member can be moved vertically from a retracted position disposed closely adjacent the rim portion 31, to the extended position shown in phantom lines in FIG. 6 wherein the guide member is disposed a significant distance above the rim portion to enable placement of the container 20 over the vessel 30.

Figure 7:
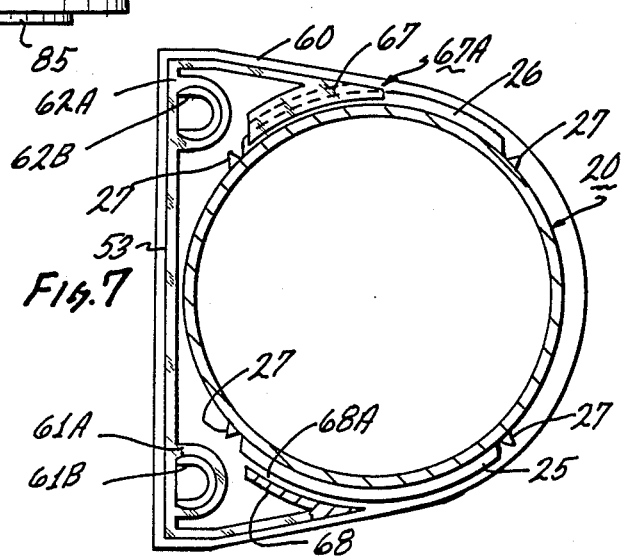
FIG. 7a is cross sectional view taken on line 7—7 of FIG. 6 illustrating details of container engagement.

To load the container 20, the guide member 60 is first lifted in the direction of arrow 90 in FIG. 1 (arrow 92 in FIG. 6). This is done with the handle member 65, by inserting the fingers in finger well 66 and lifting upwardly. Then, the container 20 is moved in the direction of arrow 91 (arrow 93 in FIG. 6) so that the flanges 25 and 26 slide into the grooves 67A and 68A defined by grooved portions 67 and 68 on the underside of the guide member 60 (FIG. 7).

Once the container 20 is loaded, the guide member 60 is released. This allows the container to descend telescopically over the vessel 30 to a position in which the cake surface 22 is atop the apertured member 40, with the guide member exerting a downward force to retain the cake surface in position when the upward flow of liquid out of openings 41 commences.

Liquid coupling components are provided in the device 10 for coupling a flow of a liquid from a separate source to the vessel 30. With the cake surface disposed over the vessel mouth 32, the liquid fills the vessel, washes across the cake surface to dispense the composition from the cake, and discharges over the rim portion 31 with the container descending over the vessel as the composition is washed away, or dispensed into the liquid.

The liquid coupling components include the inlet opening 70 defined by a lower portion of the vessel 30 (FIGS. 2 and 5). The line 71 couples the inlet opening in fluid communication with the solenoid valve 72, and the line 73 couples the solenoid valve to a separate pressurized supply of liquid. The solenoid valve 72 comprises a well known electrically energized valve arrangement for controlling liquid flow, and it serves to control the flow of liquid to the vessel 30. The solenoid valve is mounted upon suitable support structure such as the board 74, and the board is mounted within the sleeve 51 by suitable means such as a pair of mating groove portions 75 formed integrally on the interior of the sleeve 51.

The timer circuitry 76 is mounted similarly on a board 78 mounted within a pair of mating grooved portions 77. The timer circuitry 76 employs suitable electronic circuitry, such as a microprocessor chip, and it is connected to a source of power by line 79.

The timer circuitry 76 controls the solenoid valve 75 according to a desired timing sequence, using electronic circuitry well known in the art. It is connected to solenoid valve 72 by suitable means, such as interconnection by wiring (not shown), to electrically energize the solenoid valve according to the timing sequence.

Activation of the solenoid valve 72 enables a flow of liquid coupled from a separate pressurized source of liquid to flow through inlet opening 70 into the vessel interior. As the liquid dispenses the caked composition and discharges over the rim portion 31, it is collected in well 80 which comprises the space between the sleeve 51, and the forward enclosure portion 52 and backplate 53. Interconnecting portion 52A of the support structure 50 (FIGS. 2-4) joins the sleeve 51 to the forward enclosure portion 52 and backplate 53 to form a liquid tight compartment, or well 80.

A pair of cylindrical outlet couplings 81 and 82 is attached to the interconnecting portion 52A, through which to outlet the liquid from the well 80 (FIGS. 2 and 4). The outlet opening 83 in FIG. 5 outlets the liquid through outlet coupling 82, the corresponding outlet opening for outlet coupling 81 not being visible in the drawings. And, a removable baseplate 85 attached to the support structure by suitable means (not shown) covers the lower end of the sleeve 51 so that the components within are protected.

Figure 8:
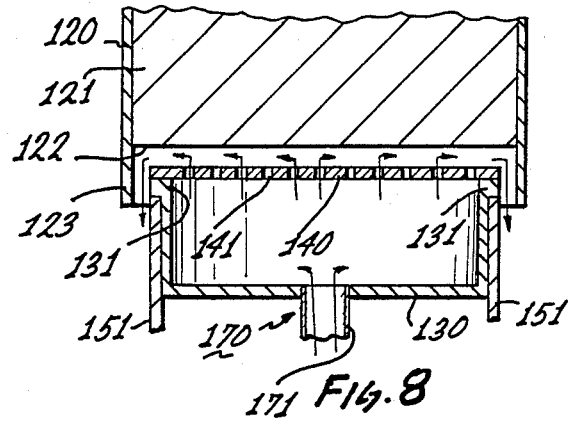
FIG. 8 is a diagrammatic representation of the caked composition disposed over the vessel mouth, showing the liquid flow across the cake surface.

The flow of liquid across the cake surface that dispenses the composition from the cake is illustrated diagrammatically in FIG. 8. The distance between the cake surface and the apertured member 40 is exaggerated for illustrative convenience, and reference numerals are increased by 100 over those designating similar components elsewhere in the drawings.

With the container in position over the vessel and the cake surface covering the vessel mouth, the flow of liquid proceeds as illustrated by the arrows in FIG. 8, through the inlet opening 70 to fill the vessel, through the openings 41 in the apertured member 40, and across the cake surface 22 to discharge over the rim portion 31. Thus, the new and improved device 10 dispenses the composition from the cake surface more evenly to provide a more uniform concentration in the discharging liquid and alleviate crumbling of the caked composition.

As various changes may be made in the form, construction, and arrangement of the described components without departing from the spirit and scope of the invention and without sacrificing any of its advantages, all matter herein is to be interpreted as illustrative and not in any limiting sense.

What is claimed is:

1. A device for dispensing a caked composition into a liquid, comprising:
   a container having an open end;
   a cake of the composition to be dispensed, which cake is disposed within the container to provide a cake surface generally facing and accessible through the open end of the container;

an upwardly opening vessel having a rim portion defining a vessel mouth, the vessel having a size and shape enabling the end of the container to be placed telescopically over the rim portion to a position in which the cake surface is disposed over the vessel mouth;

support means, including a support structure upon which the vessel is mounted in a position enabling placement of the container over the vessel, for supporting the vessel with the vessel mouth facing upwardly and the rim portion disposed horizontally; and liquid coupling means, including a portion of the vessel defining an inlet opening through which to pass a flow of liquid, for coupling a flow of a liquid from a separate source to the vessel, so that with the cake surface disposed over the vessel mouth, the liquid fills the vessel, washes across the cake surface to dispense the composition from the cake, and discharges over the rim portion, with the container descending over the vessel as the composition is dispensed;

the container being positioned over the rim portion of the vessel, with the cake surface disposed over the vessel mouth.

2. A device as recited in claim 1, further comprising:

flow equalizing means, including an apertured member disposed across the vessel mouth to define an array of openings through which the liquid must flow, for equalizing the flow of liquid across the cake surface.

3. A device as recited in claim 1, further comprising:

outlet means for collecting and outletting the liquid once it has discharged over the rim portion.

4. A device as recited in claim 1, further comprising:

valve means for controlling the flow of liquid to the vessel; and timer means for controlling the valve means according to a desired timing sequence.

5. A device as recited in claim 1, wherein the container includes:

a first end through which the cake surface is accessible;

a closed end opposite the first end; and flange means, including a pair of radially outwardly extending, integrally-formed flanges on an exterior portion of the container at the closed end, for engaging a pair of spaced-apart grooves on a container-engaging member as the container is placed over the vessel.

6. A device as recited in claim 1, wherein the container includes:

gripping means, including a plurality of integrally-formed ribs disposed on an exterior portion of the container, for enhancing gripping engagement of the container with the hands of a user.

7. A device as recited in claim 1, further comprising:

a container-engaging member attached to the support structure, the container-engaging member including means for engaging a portion of the container as the container is placed over the vessel;

attachment means for attaching the container-engaging member to the support structure so that the container-engaging member can be moved vertically from a retracted position disposed closely adjacent the rim portion to an extended position disposed a sufficient distance above the rim portion to enable placement of the container over the vessel;

retraction means for causing the container-engaging member to descend to the retracted position while retaining the container in desired alignment as the container descends over the vessel.

8. A device as recited in claim 7, wherein the retraction means includes:

spring biasing means for spring biasing the container-engaging member toward the retracted position to retain the cake surface closely adjacent the vessel mouth.

9. A device as recited in claim 7, wherein the means for engaging a portion of the container, comprises:

a pair of radially outwardly extending flanges on an exterior portion of the container; and a pair of spaced-apart grooves on the container-engaging member positioned and arranged to engagingly receive the pair of flanges.

10. A device for dispensing a caked composition into a liquid from a container filled to a desired level with a cake of the composition to provide a cake surface accessible through an end of the container, comprising:

an upwardly opening vessel having a rim portion defining a vessel mouth, the vessel having a size and shape enabling an end of a container to be placed telescopically over the rim portion to a position in which a cake surface of a cake of a composition to be dispensed is disposed over the vessel mouth;

support means, including a support structure upon which the vessel is mounted in a position enabling placement of the container over the vessel, for supporting the vessel with the vessel mouth facing upwardly and the rim portion disposed horizontally;

liquid coupling means, including a portion of the vessel defining an inlet opening through which to pass a flow of liquid, for coupling a flow of a liquid from a separate source to the vessel, so that with the cake surface disposed over the vessel mouth, the liquid fills the vessel, washes across the cake surface to dispense the composition from the cake, and discharges over the rim portion, with the container descending over the vessel as the composition is dispensed;

a container-engaging member attached to the support structure, the container-engaging member including means for engaging a portion of the container as the container is placed over the vessel;

attachment means for attaching the container-engaging member to the support structure so that the container-engaging member can be moved vertically from a retracted position disposed closely adjacent the rim portion to an extended position disposed a sufficient distance above the rim portion to enable placement of the container over the vessel; and retraction means for causing the container-engaging member to descend to the retracted position while retaining the container in desired alignment as the container descends over the vessel.

11. A device as recited in claim 10, further comprising:

flow equalizing means, including an apertured member disposed across the vessel mouth to define an array of openings through which the liquid must flow, for equalizing the flow of liquid across the cake surface.

12. A device as recited in claim 10, further comprising:
   outlet means for collecting and outletting the liquid once it has discharged over the rim portion.

13. A device as recited in claim 10, wherein the means for engaging a portion of the container, comprises:
   a pair of spaced-apart grooves on the container-engaging member positioned and arranged to receive engagingly a complementary pair of radially outwardly extending flanges on an exterior portion of the container.

14. A device as recited in claim 10, further comprising:
   valve means for controlling the flow of liquid to the vessel; and
   timer means for controlling the valve means according to a desired timing sequence.

15. A device as recited in claim 10, wherein the retraction means includes:
   spring biasing means for spring biasing the container-engaging member toward the retracted position to retain the cake surface closely adjacent the vessel mouth.

16. A device for dispensing a caked composition into a liquid from a container filled to a desired level with a cake of the composition to provide a cake surface accessible through an end of the container, comprising:
   an upwardly opening vessel having a rim portion defining a vessel mouth, the vessel having a size and shape enabling an end of a container to be placed telescopically over the rim portion to a position in which a cake surface of a cake of a composition to be dispensed is disposed over the vessel mouth;
   support means, including a support structure upon which the vessel is mounted in a position enabling placement of the container over the vessel, for supporting the vessel with the vessel mouth facing upwardly and the rim portion disposed horizontally;
   liquid coupling means, including a portion of the vessel defining an inlet opening through which to pass a flow of liquid, for coupling a flow of a liquid from a separate source to the vessel, so that with the cake surface disposed over the vessel mouth, the liquid fills the vessel, washes across the cake surface to dispense the composition from the cake, and discharges over the rim portion, with the container descending over the vessel as the composition is dispensed; and
   a container filled to a desired level with a cake of the composition to be dispensed, the container having a complementary size and shape dimensioned and arranged to fit telescopically over the vessel.

17. A device as recited in claim 16, wherein the container includes:
   gripping means, including a plurality of integrally-formed ribs disposed on an exterior portion of the container, for enhancing gripping engagement of the container with the hands of a user.

18. A device as recited in claim 16, wherein the container includes:
   a first end through which the cake surface is accessible;
   a closed end opposite the first end; and
   flange means, including a pair of radially outwardly extending, integrally-formed flanges on an exterior portion of the container at the closed end, for engaging a pair of spaced-apart grooves provided for container engagement.

19. A method of dispensing a caked composition into a liquid, comprising:
   using a container having an open end that is filled to a desired level with a cake of the composition to be dispensed, to provide a cake surface generally facing and accessible through the open end of the container;
   placing the container telescopically over an upwardly opening vessel having a horizontally disposed rim portion and upwardly facing vessel mouth, so that the cake surface is disposed over the vessel mouth; and
   coupling a flow of a liquid from a separate source through an inlet opening into the vessel, so that the liquid fills the vessel, washes across the cake surface to dispense the composition from the cake, and discharges over the rim portion, with the container descending over the vessel as the composition is dispensed.

* * * * *